United States Patent [19]

Cieszkiewicz et al.

[11] Patent Number: 5,303,468
[45] Date of Patent: Apr. 19, 1994

[54] METHOD OF MANUFACTURING A CRANKSHAFT

[75] Inventors: Anthony F. Cieszkiewicz, Metamora; Thomas E. Clements, Peoria, both of Ill.

[73] Assignee: Caterpillar Inc., Peoria, Ill.

[21] Appl. No.: 829,006

[22] PCT Filed: Dec. 2, 1991

[86] PCT No.: PCT/US91/08885
§ 371 Date: Dec. 2, 1991
§ 102(e) Date: Dec. 2, 1991

[87] PCT Pub. No.: WO93/11366
PCT Pub. Date: Jun. 10, 1993

[51] Int. Cl.⁵ .............................. B23D 15/00
[52] U.S. Cl. ........................... 29/888.08; 29/428
[58] Field of Search ............... 29/888.08, 428; 74/595, 74/597

[56] References Cited

U.S. PATENT DOCUMENTS

| | | |
|---|---|---|
| 1,504,238 | 8/1924 | Hildebrand . |
| 1,588,850 | 6/1926 | Murray . |
| 3,772,763 | 11/1973 | Henson et al. ............ 29/470.3 |
| 5,088,345 | 2/1992 | Kemmler et al. ........ 29/888.08 X |
| 5,134,900 | 8/1992 | Swars ..................... 74/597 |
| 5,207,120 | 5/1993 | Arnold et al. ............. 74/595 |

FOREIGN PATENT DOCUMENTS

| | | |
|---|---|---|
| 722345 | 3/1932 | France . |
| 1504991 | 12/1967 | France . |
| 2103759A | 2/1983 | United Kingdom . |

OTHER PUBLICATIONS

"Patent Abstracts of Japan", vol. 014, No. 093 (M-0939) 21 Feb. 1990 & JP,A,1 303 309 (Komatsu) 7 Dec. 1989 (see Abstract).

"Patent Abstracts of Japan", vol. 013, No. 334 (M-855) 27 Jul. 1989 & JP,A,1 112 013 (Toshiba) 28 Apr. 1989 (see Abstract).

"Patent Abstracts of Japan", vol. 011, No. 082 (M-571) 12 Mar. 1987 & JP,A,61 238 480 (Mitsubishi) 23 Oct. 1986 (see Abstract).

*Primary Examiner*—Irene Cuda
*Attorney, Agent, or Firm*—Calvin E. Glastetter

[57] ABSTRACT

A crankshaft is manufactured by providing a plurality of initially completely discrete crankshaft segments electron-beam welded together. Tubular bearing journals (12,14) having an inclined surface (30) are positioned in a groove (35,40) of a counterweight web (16) and a groove (50) of a crankshaft end (18). The discrete segments (12,14,16,18) are positioned and maintained in position by the interaction of inclined surfaces (30) and grooves (35,40,50) for electron-beam welding.

10 Claims, 2 Drawing Sheets

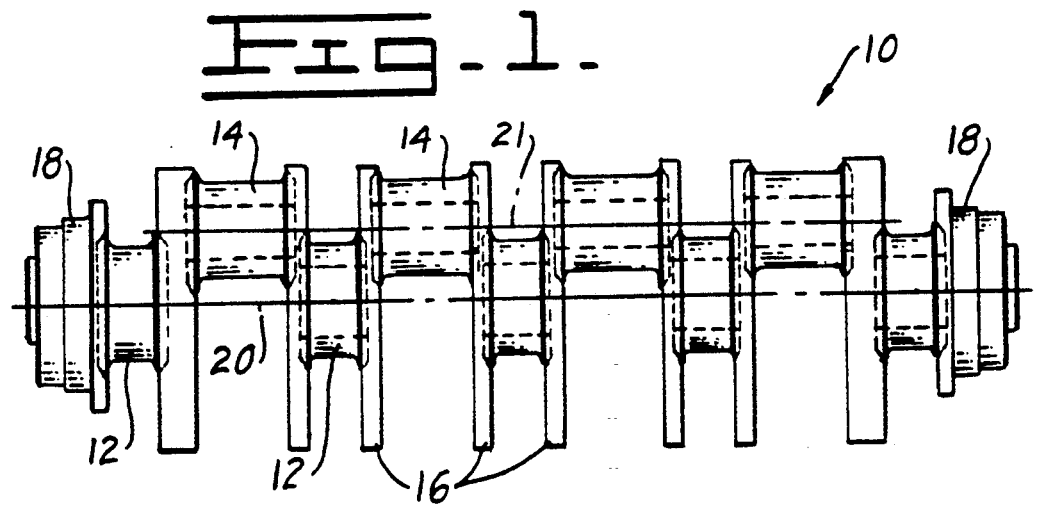
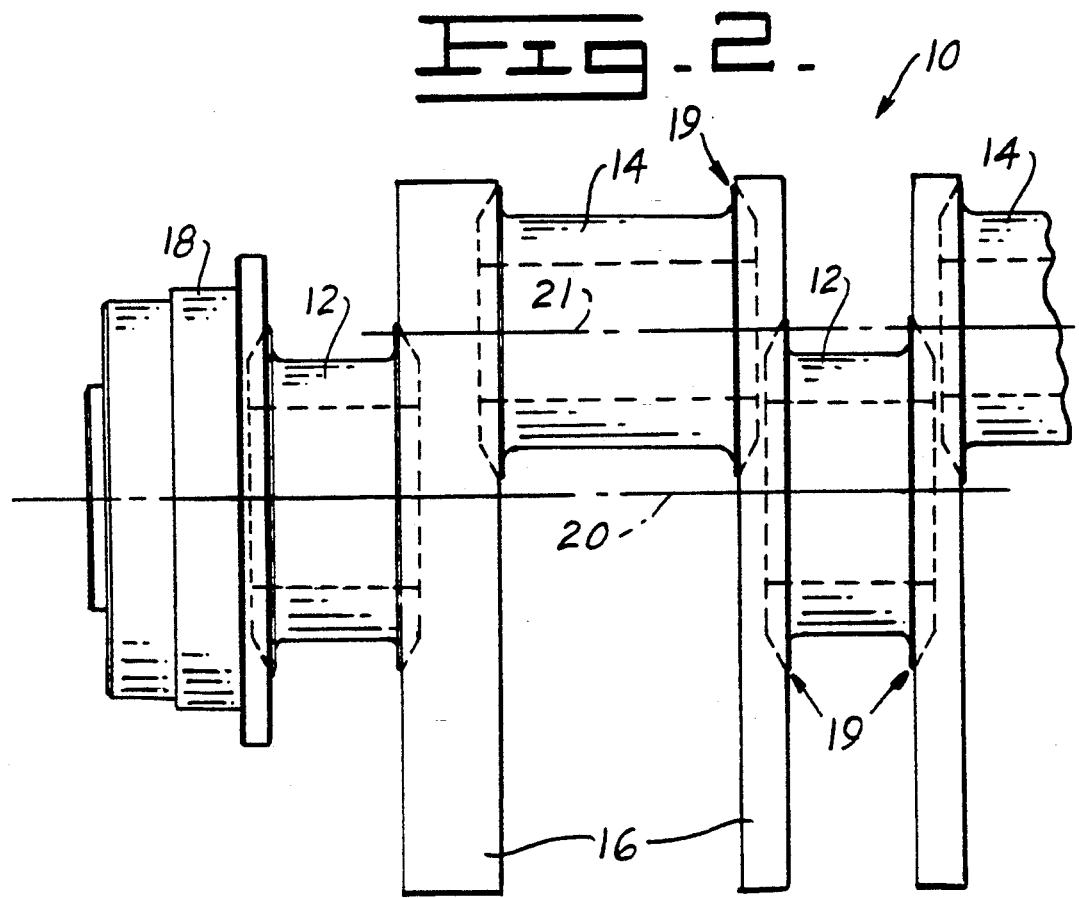

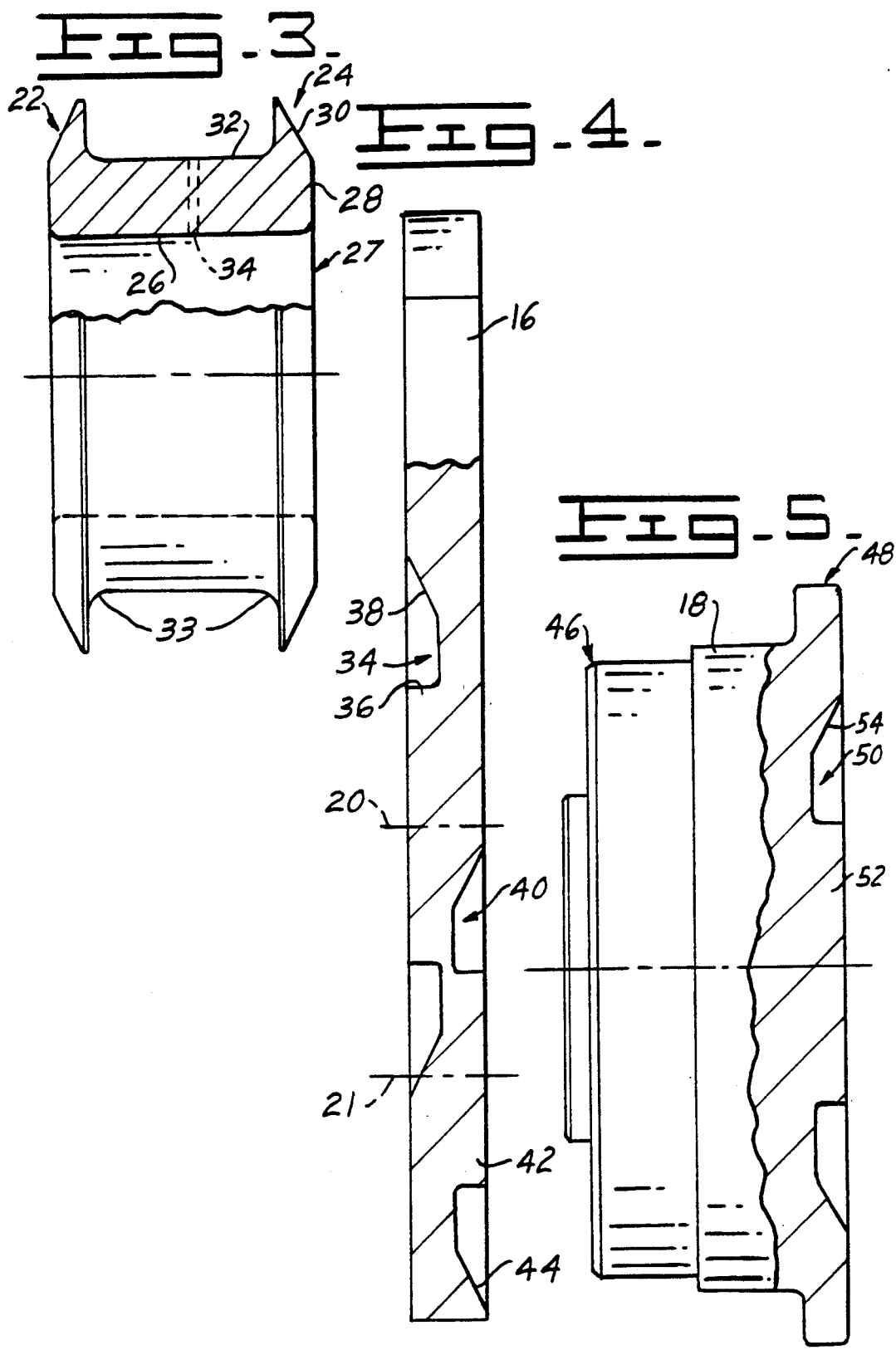

1

METHOD OF MANUFACTURING A CRANKSHAFT

TECHNICAL FIELD

This invention relates generally to a crankshaft and more particularly to a method of manufacturing the crankshaft. The invention is specifically directed to a lightweight crankshaft comprising a plurality of initially discrete web sections and tubular journal sections which are finish machined and heat treated prior to assembly and have complimentary engageable surfaces joined to each other by electron-beam welding.

BACKGROUND ART

Prior attempts to manufacture individual crankshaft segments and subsequently join the segments by means of conventional or friction welding techniques have proven to be too costly and time consuming. One of the problems involved in such prior attempts is that the individual components where not finish machined and heat treated before assembly therefore the assembled crankshaft needed to be machined and heat treated as a unit and the components selection could not be optimized for useage.

DISCLOSURE OF THE INVENTION

In an aspect of the present invention, a method of manufacturing a crankshaft is provided by manufacturing a plurality of main bearing journal sections. Manufacturing a plurality of connecting rod journal sections. Manufacturing a plurality of counterweight web sections. Manufacturing a pair of crankshaft end. Aligning the journal sections with the counterweight webs and the crankshaft ends. Welding together the separate components.

The present invention provides a lightweight crankshaft which uses finish machined and heat treated separate components assembled and electron-beam welded together.

BRIEF DESCRIPTION OF THE DRAWINGS

FIG. 1 is a longitudinal view of a crankshaft constructed in accordance with the present invention;

FIG. 2 is an enlarged partial sectional view of a portion of a crankshaft;

FIG. 3 is a partial sectional view of a crankshaft journal;

FIG. 4 is a partial sectional view of a counterweight web; and

FIG. 5 is a partial sectional view of a crankshaft end.

BEST MODE FOR CARRYING OUT THE INVENTION

Referring now to FIGS. 1 and 2, there is shown a crankshaft 10 which includes a plurality of main bearing journals 12, a plurality of connecting rod journals 14, a plurality of counterweight webs 16, and a pair of crankshaft ends 18 joined together by electron-beam welding, as shown by reference numeral 19. The main bearing journals 12 and the pair of crankshaft ends 18 are on a central axis of rotation 20 of the crankshaft 10. The connecting rod journals are on a second axis 21, parallel and spaced a predetermined distance from the central axis of rotation 20.

As shown in FIGS. 1 and 3, the main bearing journals 12 and the connecting rod journals 14 are similar in construction; therefore, only one will be described in detail. Each of the journals 12,14 is tubular in shape and has a first end portion 22 and a second end portion 24 and a central bore 26 extending therebetween. The end portions 22,24 each have an engageable surface 27. The engageable surface 27 includes an end surface 28 and an outwardly inclined surface 30 angling a predetermined degree with respect to the central axis 20 toward the other end portion. A reduced diameter bearing surface 32 extends between the end portions 22,24. An annular radial transition 33 smoothly blends the bearing surface 32 with the end portions 22,24. Each journal has an oil hole 34 extending from the central bore 26 to the bearing surface 32.

As shown in FIGS. 1 and 4, all of the counterweight webs 16 are produced from plate stock and are identical; therefore, only one will be described in detail. An annular groove 34 is formed in one side of the counterweight web 16 on the central axis of rotation 20 for receiving the engageable surface 27 of the main bearing journal 12. The annular groove 35 defines a central boss 36 sized to be inserted in the central bore 26 of the main bearing journal 12. The annular groove 34 has an outwardly inclined outer surface 38 angling a predetermined degree with respect to the central axis of rotation 20. An annular groove 40 is formed on the other side of the counterweight web 16 on the second axis 21 for receiving the engageable surface 27 of the connecting rod journal 14. The annular groove 40 defines a central boss 42 sized to be inserted into the central bore 26 of the connecting rod journal 14. The annular groove 40 has an outwardly inclined outer surface 44 angling a predetermined degree with respect to the second axis 20.

As shown in FIGS. 1 and 5, both of the pair of crankshaft ends 18 are identical; therefore, only one will be described in detail. The crankshaft end 18 has a first end 46 for removable attachment of accessories (not shown) and a second end 48 having an annular groove 50 for receiving the engagement surface 27 of the main bearing journal 12. The annular groove 50 defines a central boss 52 sized to be inserted in the central bore 26 of the main bearing journal 12. The annular groove 50 has an outwardly inclined outer surface 54 angling a predetermined degree with respect to the central axis of rotation 20.

INDUSTRIAL APPLICABILITY

Each of the journals 12,14 is processed from bar stock cut to a predetermined length. The journals 12,14 are machined to produce a reduced diameter bearing surface 22 and the engageable surfaces 25 of the end portions 23,24. The radius 33 smoothly blends the bearing surface 22 with the end portions 23,24 to reduce fatigue points in the journals 12,14. After machining the journals are heat treated, quenched and tempered, to produce high compressive recidual stresses in the radius 33 to improve crankshaft wear. After heat treat the journals are drilled to produce the central bore 26. Holes 34 are drilled for directing lubricant, such as oil, from the central bore 26 to the bearing surface 22.

The counterweight webs 16 can be produced from plate material and not require any special heat treatment. The grooves 35,40 are machined in opposite sides of the webs 16 for receiving the engageable surface 27 of the journals 12,14.

The individual counterweight webs 16, tubular journals 12,14, and crankshaft ends 18 are joined to each other by an electron-beam welding operation. The components can be placed in a fixture (not shown) which will maintain the components in proper alignment for electron-beam welding. The components can be assembled to be used for different size engines. The crankshaft end 18 has the annular groove 50 for receiving the engagement surface 27 of the main bearing journal 12. The opposite end of the main bearing journal 12 has an engagement surface 27 which is placed in the annular groove 35 of the counterweight web 16. The opposite side of the counterweight web 16 has the annular groove 40 for receiving the engagement surface 27 of the connecting rod journal 14. Another counterweight web 16 having the annular groove 40 is placed on the engagement surface 27. The number of counterweight webs 16, main bearing journals 12, and connecting rod journals will vary according to the engine size. When the proper length of the crankshaft is assembled, a second crankshaft end 18 is added to complete the crankshaft. The components can be electron-beam welded together as they are assembled or all the components can be assembled and aligned, and then electron-beam welded as the entire crankshaft 10 is held in position. Electron-beam welding was chosen over other welding methods because the weld coan be concentrated to a smaller area without affecting the heat treatment and machining of the individual components.

In view of the foregoing, it is readily apparent that the structure of the present invention provides a lightweight crankshaft manufactured of a plurality of finish machined and heat treated components having inclined surfaces and grooves which interact to position the segments for electron-beam welding together of the segments to form a crankshaft. The components can be machined as smaller pieces not requiring large machines to finish the crankshaft as an assembly.

Other aspects, objects and advantages of the invention can be obtained from a study of the drawings, the disclosure and the appended claims.

We claim:

1. A method of manufacturing a crankshaft (10) comprising the steps of:
    manufacturing a plurality of main bearing journal sections (12), each having engageable surfaces (27) including end surfaces (28) and inclined surfaces (30) on both ends (22,24);
    manufacturing a plurality of connecting rod journal sections (14), each having engageable surfaces (27) including end surfaces (28) and inclined surfaces (30) on both ends (22,24);
    manufacturing a plurality of counterweight web sections (16), each having a first annular groove (35) including an end surface and an inclined surface (38) on one side for receiving end surface (28) and inclined surface 30 of the engageable surface (27) of the main bearing journal (12) and a second annular groove )40) including an end surface and an inclined surface (40) on the opposite side for receiving end surface (28) and inclined surface 30 of the engageable surface (27) of the connecting rod journal (14);
    manufacturing a pair of crankshaft ends (18), each having an annular groove (50) including an end surface and an inclined surface (54) on one end for receiving end surfaces (28) and inclined surface (30) of the engageable surface (27) of the main bearing journal section (12);
    aligning the end surfaces (28) and inclined surfaces (30) of the engageable surfaces (27) of the journal sections (12,14) with the end surfaces and inclined surfaces (38,44,54) of the annular grooves (35,40,50) of the counterweight web sections (16) and the crankshaft ends (18); and
    welding (19) together the separate components at the juncture of the engageable surfaces (27) with the annular groove (35,40,50).

2. A method of manufacturing a crankshaft (10) as set forth in claim 1 wherein each of the main bearing journal sections (12) has a tubular shape.

3. A method of manufacturing a crankshaft (10) as set forth in claim 2 wherein each of the connecting rod journal sections (14) has a tubular shape.

4. A method of manufacturing a crankshaft (10) as set forth in claim 3 wherein the main bearing journal (12) defines a central hole (26).

5. A method of manufacturing a crankshaft (10) as set forth in claim 4 wherein the connecting rod journal section (14) defines a central bore (26).

6. A method of manufacturing a crankshaft (10) as set forth in claim 5 wherein the counterweight web (16) is manufactured from a steel plate and the annular grooves (35,40) define a central boss (36,42) sized to be inserted into the central bore (26) of the journals (12,14).

7. A method of manufacturing a crankshaft (10) as set forth in claim 6 wherein the annular groove (50) of the crankshaft end (18) defines a central boss (52) sized to be inserted into the central bore (26) of the main bearing journal section (12).

8. A method of manufacturing a crankshaft (10) as set forth in claim 7 wherein the crankshaft ends (18) and the main bearing journal sections (12) are located along a central axis of rotation (20) of the crankshaft (10).

9. A method of manufacturing a crankshaft (10) as set forth in claim 8 wherein the connecting rod journal sections (14) are located on a second axis (21) parallel and spaced a predetermined distance from the central axis of rotation (20).

10. A method of manufacturing a crankshaft (10) as set forth in claim 9 wherein the separate pieces (12,14,16,18) are electron-beam welded (19) together.

* * * * *